Patented Jan. 3, 1939

2,142,311

UNITED STATES PATENT OFFICE 2,142,311

PROCESS FOR THE PREPARATION OF WASHED OUT RELIEFS

Johannes Heidenhain, Berlin, Germany

No Drawing. Application January 10, 1938, Serial No. 184,321. In Germany March 15, 1934

4 Claims. (Cl. 95—6)

My invention relates to a process for the preparation of washed out reliefs by tanning development of halogen silver colloid films and consists in employing halogen silver films, which contain alcohol-soluble proteins as colloids.

It is known to prepare washed out reliefs by tanning development of chromate-protein films. These films require a very long time exposure and high current consumption.

The object of my invention is to prepare light-sensitive films, which on the one hand possess the properties of the known bichromate-resin films, for example solubility at the non-exposed positions, capability of being hardened and resistance to etching, and on the other hand the high sensitiveness to light of photographic halogen silver films.

The preparation of these light-sensitive halogen silver containing films may be effected according to this invention as follows:

The alcohol-soluble natural proteins are preferably subjected to a pre-treatment, as a result of which the proteins are more strongly tanned by the developer and the photographic properties of the emulsion prepared therewith are improved.

According to my invention the proteins are for this purpose treated with suitable chemical reagents or subjected to a physical action, whereby it is possible in both cases to alter the properties of the natural protein in a manner favorable for the process of this invention. The pre-treatment may be effected, for example 1. By enzymes,
2. By acids,
3. By alkalies,
4. By the action of heat.

A further after-treatment for preserving the favorable properties imparted to the proteins may follow immediately on this pre-treatment or be effected at a suitable stage of the emulsifying process, for example by the addition of stabilizers. Inorganic salts in admixture with acids and bases, or salts and compounds, which are partially or entirely of organic origin and have the property of influencing the solubility of the protein, may be used as stabilizers.

The following example serves to illustrate how the process of this invention may be carried into effect:

5 gms. of protein, for example purified gliadin, are dissolved in 50 ccs. of 70% alcohol at a temperature of about 40° C. After solution has taken place, 10 ccs. of n/2 caustic potash solution and 66 ccs. of 96% alcohol are added. This solution is maintained in a thermostat for 60 minutes at 37° C. with constant stirring and thereafter the protein is precipitated by pouring into 350 ccs. of distilled water containing 0.7 cc. of glacial acetic acid.

In order to complete precipitation 5 gms. of ammonium sulphate are added for salting out purposes, the whole is filtered through a filtering cloth, the precipitate is thoroughly washed on the filter with ammonium sulphate-containing water and thereafter thoroughly expressed and the protein is finally dried, or, after adding sodium acetate as stabilizer, is preserved in a dissolved condition. From the material so obtained the light-sensitive, halogen silver containing emulsion is prepared by known methods.

The dried material (for example about 3 to 5 gms.) is dissolved in 50 ccs. of 65% alcohol. The subsequent procedures are similar to those employed in the preparation of gelatine emulsions. 0.75 gm. of potassium bromide and 0.026 gm. of potassium iodide are for example dissolved in the protein solution. 1.05 gms. of silver nitrate are dissolved in 20 ccs. of 65% alcohol and ammonia is added until the resulting precipitate just re-dissolves. This silver salt solution is added to the protein solution and the resulting emulsion is matured for two hours at 55° C. with stirring. The excess salts are removed by pouring the emulsion into ammonium sulphate-containing water, the whole is then filtered and the residue on the filter is expressed. After re-dissolving in about 30 ccs. of 70% alcohol the emulsion is ready for pouring and may then be applied to single or combined film bases, for example by centrifuging.

After drying, light-sensitive films as aforesaid may be kept for a relatively long time and be used for making copies or for taking photographs in a camera. After exposure, development is effected for example with a sulphite-free pyrocatechol developer and the non-exposed parts are washed out, for example with 70% alcohol.

Any kind of metal plates and transparent materials may be used as single film bases and as combined film bases those, which have a non-transparent film superimposed on a transparent base, the non-transparent film being subsequently dissolved away at the non-tanned positions.

Metal plates, for example a copper plate, after exposure are developed by tanning in a sulphite-free pyrocatechol developer and washed in 70% alcohol. Only the non-exposed parts of the photographic film are dissolved thereby.

In this manner a washed out relief is accordingly obtained, which may be used as an etching base for the preparation of electros, stereotypes etc. Offset printing plates may be prepared in a similar manner.

According to another embodiment of my invention, a non-transparent intermediate film, for example a lead sulphide mirror, may be interposed between the light-sensitive film and a transparent base, for example glass. Two advantages are obtained thereby:

1. When using a sufficiently thin emulsion film a true reproduction of the object is obtained, in that no halation can take place and 2. Practically the maximum contrast effect theoretically possible is obtained owing to the fact that, after the preparation of the washed out relief as hereinbefore described, the lead sulphide mirror at the washed out parts can be reached and dissolved away by a suitable etching medium.

If lead sulphide constitutes the non-transparent film, use is made as etching medium of Farmer's clearing agent (used in photography).

The hereinbefore described light-sensitive plates are particularly suitable for every kind or line- and autotype photographic reproductions and are distinguished by a particularly high contrast effect (the maximum possible). In other words the transition from non-transparent to transparent is sudden and without halftone. Consequently copies of these plates can be prepared particularly satisfactorily and easily.

The process of this invention accordingly enables the several operations to be substantially simplified and shortened as compared with the known processes and combines the advantages of the bichromate films and the highly sensitive photographic plates hitherto used.

Having now particularly described and ascertained the nature of my said invention and in what manner the same is to be performed, I declare that what I claim is:

1. A process for the preparation of washed out reliefs containing alcohol soluble proteins as colloids consisting in dissolving 5 grams of protein in 50 ccs. of 70% alcohol at a temperature of about 40° C., adding 10 ccs. of n/2 caustic potash solution and 66 ccs. of 96% alcohol to the solution, maintaining this solution at 37° C., for 60 minutes, with constant stirring, precipitating the protein by pouring the solution into 350 ccs. of distilled water containing 0.7 cc. of glacial acetic acid, adding 5 gms. of ammonium sulphate for salting out purposes, filtering the whole through a filtering cloth, thoroughly washing the precipitate with an aqueous ammonium sulphate solution, thereafter thoroughly expressing and drying the protein, and finally preparing a light sensitive emulsion containing the protein and a silver halide.

2. A process for the preparation of washed out reliefs containing alcohol soluble proteins as colloids consisting in dissolving 5 grams of protein in 50 ccs. of 70% alcohol at a temperature of about 40° C., adding 10 ccs. of n/2 caustic potash solution and 66 ccs. of 96% alcohol to the solution, maintaining this solution at 37° C., for 60 minutes, with constant stirring, precipitating the protein by pouring the solution into 350 ccs. of distilled water containing 0.7 cc. of glacial acetic acid, adding 5 gms. of ammonium sulphate for salting out purposes, filtering the whole through a filtering cloth, thoroughly washing the precipitate with an aqueous ammonium sulphate solution, thereafter thoroughly expressing and drying the protein, dissolving 3 to 5 grams of the dried protein in 50 ccs. of 65% alcohol, dissolving 0.75 gram of potassium bromide and 0.026 gram of potassium iodide in the protein solution, dissolving 1.05 grams of silver nitrate in 20 ccs. of 65% alcohol adding ammonia until the resulting precipitate is just re-dissolved, adding this silver salt solution to the protein solution and maturing the resulting emulsion for two hours at 55° C., with stirring, removing the excess salts by pouring the emulsion into an aqueous ammonium sulphate solution, filtering the whole, expressing the residue, re-dissolving the residue in about 30 ccs. of 70% alcohol, and applying the emulsion to film bases.

3. A process for the preparation of washed out reliefs as claimed in claim 2, further consisting in exposing the film and developing said film with a sulphite-free pyrocatechol developer and washing out the non-exposed parts with 70% alcohol.

4. A process as claimed in claim 2 wherein gliadin is used as the alcohol soluble protein.

JOHANNES HEIDENHAIN.